3,828,035
PRODUCTION OF OXAZINE DYES WITH
ARYLAMINO GROUPS
Hans Baumann and Udo Mayer, Ludwigshafen, Germany, assignors to Badische Anilin- & Soda-Fabrik Aktiengesellschaft, Ludwigshafen (Rhine), Germany
No Drawing. Filed Feb. 1, 1972, Ser. No. 222,678
Int. Cl. C09b 19/00
U.S. Cl. 260—242                 5 Claims

ABSTRACT OF THE DISCLOSURE

Phenylamino-substituted oxazine dyes which are eminently suitable for dyeing anionically modified fibers brilliant blue shades of very good fastness properties.

---

The invention relates to a process for the production of dyes of the general formula (I)

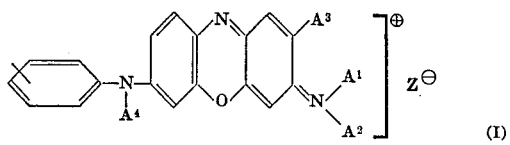

in which $A^1$ is hydrogen, unsubstiuted or substituted alkyl, cycloalkyl, aralkyl or aryl;
$A^2$ is hydrogen or unsubstituted or substituted alkyl;
$A^3$ is hydrogen or alkyl of one to four carbon atoms;
$A^4$ is hydrogen or $C_1$ to $C_4$ alkyl which may bear hydroxy, chloro, carbalkoxy or cyano as substituent;
$A^5$ is hydrogen, alkyl of one to four carbon atoms and
$Z^\ominus$ is an anion, wherein a compound of formula (II):

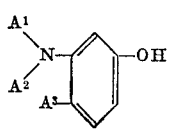

is condensed with a compound of formla (III):

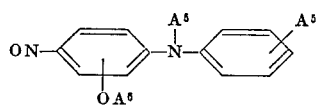

where $A^6$ is alkyl of one to four carbon atoms.
In addition to hydrogen, the following radicals are suitable for example:

for $A^1$: methyl, ethyl, n-propyl, isopropyl, n-butyl, isobutyl, cyclohexyl, benzyl, phenylethyl, phenyl, β-hydroxyethyl, β-hydroxypropyl, γ-hydroxypropyl, β-γ-dihydroxypropyl, β-cyanoethyl, β-carbomethoxyethyl, β-carboethoxyethyl, methylphenyl, chlorophenyl or methoxyphenyl,
for $A^2$: unsubstiuted or substituted alkyl as for $A^1$,
for $A^3$: methyl, ethyl, n-propyl, isopropyl, n-butyl or isobutyl,
for $A^4$: methyl, ethyl, propyl, butyl, β-hydroxyethyl, β-hydroxypropyl or β-cyanoethyl,
for $A^5$: methyl, ethyl, n-propyl, n-butyl, isobutyl, methoxy or ethoxy
for $A^6$: propyl, butyl and preferably methyl or ethyl.

The new process is of special importance for the production of compounds of the formula (Ia):

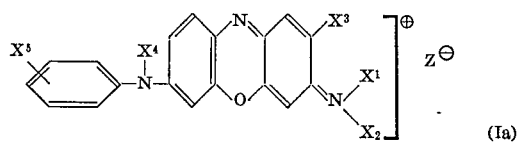

in which $X^1$ is hydrogen, methyl, ethyl or phenyl,
$X^2$ is hydrogen, methyl, ethyl, β-hydroxyethyl or cyanoethyl,
$X^3$ is hydrogen or methyl,
$X^4$ is hydrogen, methyl, ethyl, β-cyanoethyl or β-hydroxyethyl and
$X^5$ is hydrogen or methyl and
$Z^\ominus$ has the meaning given above.

Examples of anions $Z^\ominus$ are: chloride, bromide, sulfate, nitrate, methosulfate, ethosulfate, formate, acetate, oxalate, toluenesulfonate, tetrachlorozincate or complex phosphate.

Examples of compounds of formula (II) are:

3-aminophenol,
3-methylaminophenol,
3-dimethylaminophenol,
3-methyl-β-hydroxyethylaminophenol,
3-phenylaminophenol,
3-amino-4-methylphenol,
3-ethylamino-4-methylphenol,
3-cyanoethylamino-4-methylphenol or
3-diethylamino-4-methylphenol.

Examples of compounds of the formula (III) are:

3-ethoxy-4-nitrosodiphenylamine,
3-methoxy-4-nitrosodiphenylamine,
3-ethoxy-4-nitroso-2'-methyldiphenylamine,
3-ethoxy-4-nitroso-4'-methyldiphenylamine,
3-methoxy-4-nitroso-2'-methyldiphenylamine,
3-methoxy-4-nitroso-4'-methyldiphenylamine,
3-ethoxy-4-nitrosoethoxydiphenylamine,
3-methoxy-4-nitrosoethoxydiphenylamine,
3-ethoxy-4-nitrosomethoxydiphenylamine,
3-methoxy-4-nitrosomethoxydiphenylamine,
3-ethoxy-4-nitroso-N-methyldiphenylamine,
3-methoxy-4-nitroso-N-methyldiphenylamine,
3-ethoxy-4-nitroso-N-ethyldiphenylamine,
3-methoxy-4-nitroso-N-ethylidiphenylamine,
3-ethoxy-4-nitroso-N-β-cyanoethyldiphenylamine,
3-methoxy-4-nitroso-N-β-cyanoethyldiphenylamine,
3-ethoxy-4-nitroso-N-β-hydroxyethyldiphenylamine or
3-methoxy-4-nitroso-N-β-hydroxyethyldiphenylamine.

The process may conveniently be carried out by condensing the components of formulae (II) and (III) in a polar solvent at a temperature of from about 20° to 100° C., preferably from 40° to 80° C. in the presence of an acid.

Examples of suitable polar solvents are: water, alcohols such as methanol, ethanol, n-propanol, isopropanol or butanol, glycols, glycol ethers, carboxylic acids such as formic, acetic or propionic acid, dioxan of dimethylformamide or dimethylsulfoxide and mixtures of these solvents or with water.

Examples of suitable acids for the condensation are: water, alcohols such as methanol, ethanol, n-propanol, isopropanol or butanol, glycol ethers, carboxylic acids such as formic, acetic or propionic acid, dioxan of dimethylformamide or dimethylsulfoxide and mixtures of these solvents or with water.

Examples of suitable acids for the condensation are: hydrochloric acid, sulfuric acid, formic acid and acetic acid.

The anions $Z^\ominus$ may be introduced by the acid present in the condensation or by exchange, for example by double decomposition.

New dyes of particular industrial importance are those of formula (Ib):

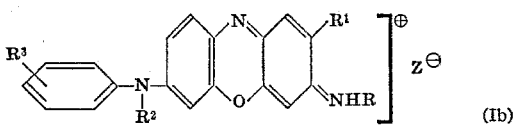

in which

R is hydrogen, alkyl of one to four carbon atoms, cyanoethyl, chloroethyl, carbalkoxyethyl or hydroxyalkyl;
$R^1$ is hydrogen, methyl or ethyl;
$R^2$ is hydrgen, alkyl of one to four carbon atoms, hydroxyalkyl, carbalkoxyethyl, cyanoethyl or chloroethyl;
$R^3$ is alkyl of one to four carbon atoms; and
$Z^\ominus$ is an anion.

Radicals R and $R^2$ may be for example (in addition to those already specifically mentioned) propyl, butyl, carbomethoxyethyl, carboethoxyethyl or carbobutoxyethyl, β-hydroxyethyl, β-hydroxypropyl and preferably methyl or ethyl.

Examples of radicals $R^3$ are butyl, ethyl and particularly methyl.

Among the new dyes, those are preferred which have the formula (Ic):

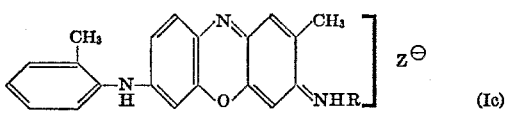

Preferred radicals R in formula (Ic) are hydrogen, methyl, ethyl or cyanoethyl.

Dyes of the formula (I) are suitable for dyeing mordanted cotton, leather, paper, inks, e.g. ball point pen inks, and preferably of textile material of acrylonitrile polymers, anionically modified polyesters or polyamides. Bright red, neutral and greenish blue dyeings are obtained with excellent fastness properties. Some of the dyes have very good solubility in water.

The following Examples illustrate the invention. Parts and percentages in the following Examples relate to weight unless otherwise stated.

EXAMPLE 1

29 g. of 3-ethoxy - 4 - nitrosophenyl-p-tolylammonium chloride, dissolved in 250 ml. of ethanol, is slowly dripped into a solution at 60° C. of 15 g. of 3-ethylamino-4-methylphenol in 250 ml. of ethanol. Thirty minutes later the whole is heated and stirred for two hours under reflux. 1500 ml. of water and 15 g. of zinc chloride are added to the cooled reaction solution. The dye is precipitated with common salt. It gives bright blue dyeings on acrylonitrile polymer fibers.

EXAMPLE 2

28 g. of 3 - methoxy - 4 - nitrosodiphenylammonium chloride and 16 g. of 3-diethyl-aminophenol are dispersed with 10 g. of a condensation product of 1 mole of sperm oil alcohol with 28 moles of ethylene dioxide in 1000 ml. of water. After the mixture has stood for forty-eight hours at room temperature saturated common salt solution is added. The deposited and isolated dye dyes polyacrylonitrile fibers bright blue shades.

EXAMPLE 3

29 g. of 3-ethoxy - 4 - nitrosophenyl-o-tolylamine, 19 g. of 3-phenylaminophenol and 15 g. of 96% sulfuric acid are dissolved in 400 ml. of glacial acetic acid and kept at 80° C. for two hours. The solution obtained is diluted with 1600 ml. of water. The dye is precipitated with 16 g. of zinc sulfate and Glauber's salt and then isolated. It dyes polyacrylonitrile fibers bright blue.

EXAMPLE 4

A solution of 29 g. of 3-ethoxy - 4 - nitrosophenyl-p-tolylammonium chloride and 13 g. of 3-amino-4-methylphenol in 300 ml. of ethanol and 200 ml. of water is stirred for two hours at refluxing temperature. Upon cooling the dye having the formula:

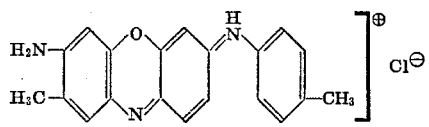

is precipitated in pure crystalline form. It gives fast blue dyeings on acrylonitrile polymers.

Analogously to the said method, the dyes characterized by their substituents in the following Table are obtained:

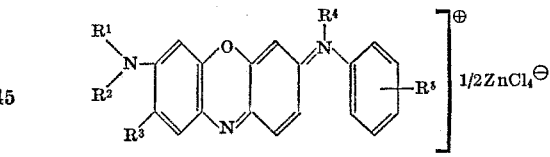

| Example | $R^1$ | $R^2$ | $R^3$ | $R^4$ | $R^5$ |
|---|---|---|---|---|---|
| 5 | CH₃ | CH₃ | H | H | p-OC₂H₅ |
| 6 | H | C₂H₄CN | CH₃ | H | p-CH₃ |
| 7 | H | C₂H₄OH | H | H | H |
| 8 | C₂H₅ | C₂H₅ | H | H | p-OCH₃ |
| 9 | C₂H₅ | C₂H₅ | H | C₂H₅ | H |
| 10 | CH₃ | CH₃ | H | CH₃ | H |
| 11 | C₂H₅ | C₂H₅ | H | C₂H₄OH | H |

EXAMPLE 12

27 g. of 3-methoxy - 4 - nitrosophenyl-o-tolylammonium chloride is introduced over two hours into a solution at 60° C. of 18 g. of 3-cyanoethylamino-4-methylphenol and 13 g. of zinc chloride in 100 ml. of ethanol. After another hour at 60° C. the solution has 300 ml. of water added to it and precipitation is completed by adding saturated common salt solution. The dye gives blue dyeings with very good fastness properties on acrylonitrile polymer fibers.

EXAMPLE 13

27 g. of 3-methoxy - 4 - nitrosophenyl-o-tolylammonium chloride is slowly introduced into a solution at 50° C. of 12 g. of 3-amino-4-methylphenol and 26 g. of zinc chloride in 100 ml. of methanol. The dye is precipitated pure as the sparingly soluble zinc chloride double salt. By conversion into the acetate a dye having good solubility is obtained which gives dyeings with very good fastness properties.

EXAMPLE 14

27 g. of 3-methoxy - 4 - nitrosophenyl-o-tolylammonium chloride is slowly introduced into a solution at 80° C. of 15 g. of 3-ethylamino-4-methylphenol and 13 g. of zinc chloride in 100 ml. of methyl glycol. The dye is precipitated pure as the zinc chloride double salt. It may easily be converted by means of a base into the dye chloride which has good solubility.

The blue dyes identified in the following Table by their substituents are obtained in an analogous way.

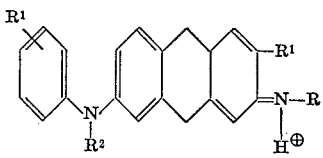

| Example | R | $R^1$ | $R^2$ | $R^3$ |
|---|---|---|---|---|
| 15 | $C_4H_9$ | H | H | o-$CH_3$ |
| 16 | $C_2H_4OH$ | $CH_3$ | H | p-$CH_3$ |
| 17 | $CH_2CHOHCH_3$ | $CH_3$ | H | p-$CH_3$ |
| 18 | $C_2H_4Cl$ | $CH_3$ | H | o-$CH_3$ |
| 19 | $C_2H_4COOCH_3$ | $CH_3$ | H | p-$CH_3$ |
| 20 | $C_2H_4COOC_4H_9$ | $CH_3$ | H | p-$CH_3$ |
| 21 | $CH_3$ | $C_2H_5$ | H | o-$CH_3$ |
| 22 | H | $CH_3$ | $CH_3$ | p-$CH_3$ |
| 23 | $C_2H_5$ | $CH_3$ | $C_4H_9$ | p-$CH_3$ |
| 24 | $C_2H_5$ | $CH_3$ | $C_2H_4OH$ | p-$CH_3$ |
| 25 | $C_2H_5$ | $CH_3$ | $CH_2CHOHCH_3$ | p-$CH_3$ |
| 26 | $C_2H_5$ | $CH_3$ | $C_2H_4COOC_2H_5$ | p-$CH_3$ |
| 27 | $C_2H_5$ | $CH_3$ | $C_2H_4CN$ | p-$CH_3$ |
| 28 | $C_2H_5$ | $CH_3$ | $C_2H_4Cl$ | p-$CH_3$ |
| 29 | H | $CH_3$ | H | p-$C_2H_5$ |
| 30 | H | $CH_3$ | H | p-$C_4H_9$ |

We claim:

1. An oxazine dye of the formula

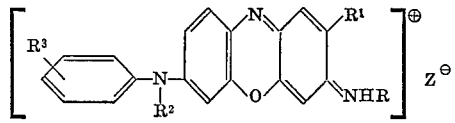

in which
R is hydrogen, alkyl of one to four carbon atoms, cyanoethyl, chloroethyl, carbalkoxyethyl of one to four carbon atoms in the alkoxy portion or hydroxyalkyl of two to three carbon atoms;
$R^1$ is hydrogen, methyl or ethyl;
$R^2$ is hydrogen, alkyl of one to four carbon atoms, hydroxyalkyl of two to three carbon atoms, carbalkoxyethyl of one to four carbon atoms in the alkoxy portion, cyanoethyl or chloroethyl;
$R^3$ is alkyl of one to four carbon atoms; and
$Z^\ominus$ is an anion selected from the class consisting of chloride, bromide, sulfate, nitrate, methosulfate, ethosulfate, formate, acetate, oxalate, toluenesulfonate, tetrachlorozincate and complex phosphate.

2. A dye as claimed in Claim 1 of the formula:

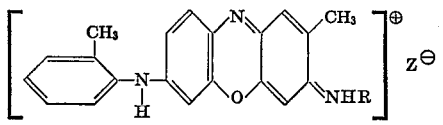

in which
R is hydrogen, methyl, ethyl or cyanoethyl; and
$Z^\ominus$ has the same meaning as in Claim 1.

3. The dye of the formula

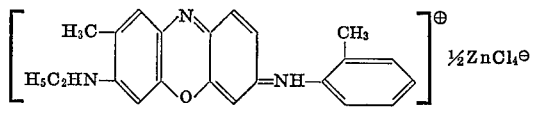

4. The dye of the formula

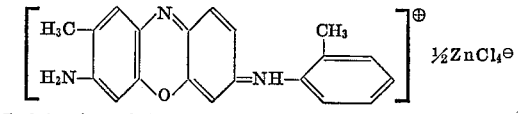

5. The dye of the formula

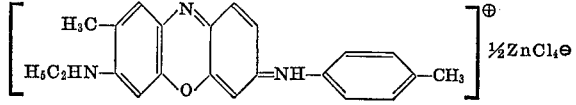

References Cited

UNITED STATES PATENTS

| 3,629,248 | 12/1971 | Schafer et al. | 260—244 |
| 2,906,589 | 9/1959 | Muller et al. | 260—244 |
| 3,681,347 | 8/1972 | Herz et al. | 260—242 |

FOREIGN PATENTS

| 9,930 | 4/1968 | Japan | 260—244 |

HARRY I. MOATZ, Primary Examiner

U.S. Cl. X.R.

260—244; 8—1 B, 177 R, 178 R, 179

UNITED STATES PATENT AND TRADEMARK OFFICE
CERTIFICATE OF CORRECTION

PATENT NO. : 3,828,035
DATED : August 6, 1974
INVENTOR(S) : Hans Baumann et al.

It is certified that error appears in the above-identified patent and that said Letters Patent are hereby corrected as shown below:

Column 1, after line 7, insert -- Claims priority, application
Germany  Feb. 3, 1971   P 21 04 891.9
Germany  Nov. 24, 1971  P 21 58 121.5 --.

In Column 1, Formula (III), delete

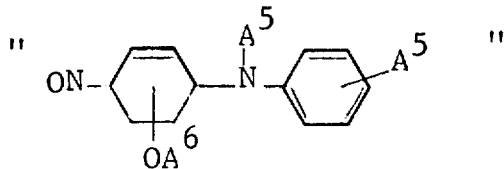

and substitute

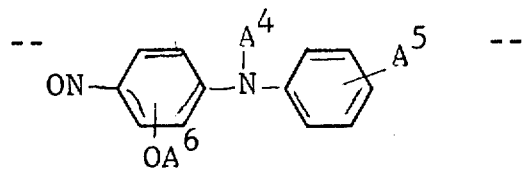

In Column 2, Line 66, delete "...about 20° to 100°..." and substitute --... about 20° to 110°...--

Signed and Sealed this

Seventh Day of September 1976

[SEAL]

Attest:

RUTH C. MASON
Attesting Officer

C. MARSHALL DANN
Commissioner of Patents and Trademarks